May 6, 1958  R. C. BENNETT  2,833,320
WIDE BOARD SAW APPARATUS
Filed May 6, 1952  2 Sheets-Sheet 1
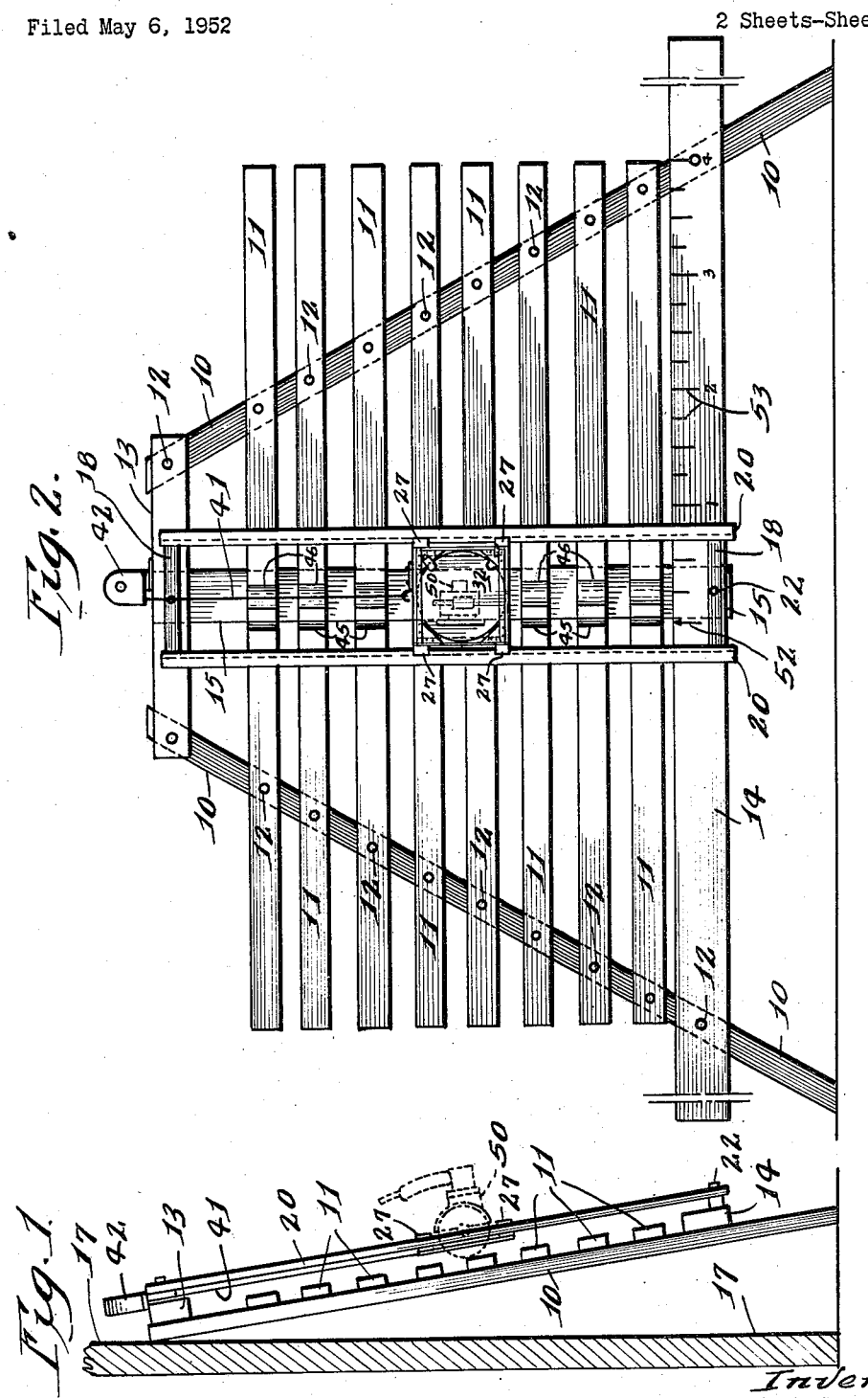
Inventor:
Richard C. Bennett.
By. Edw. R. Hampson
Attorney.

May 6, 1958  R. C. BENNETT  2,833,320
WIDE BOARD SAW APPARATUS
Filed May 6, 1952  2 Sheets-Sheet 2
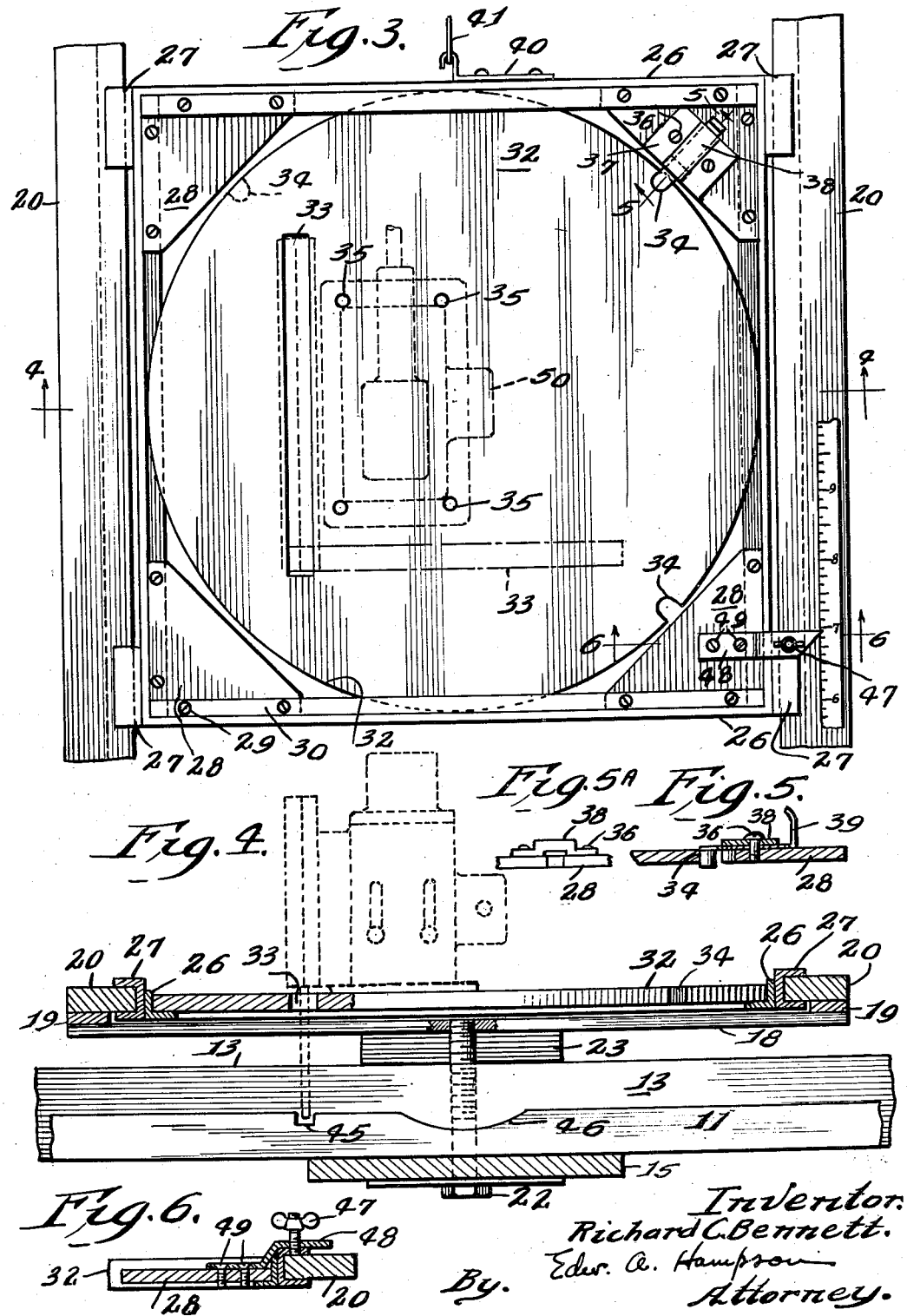
Inventor:
Richard C. Bennett.
By Edw. A. Hampson
Attorney.

United States Patent Office 2,833,320
Patented May 6, 1958

2,833,320

WIDE BOARD SAW APPARATUS

Richard C. Bennett, Laceyville, Pa.

Application May 6, 1952, Serial No. 286,278

8 Claims. (Cl. 143—47)

This invention relates to a new and novel device for sawing wide or big boards such as fiber insulation boards, plywood, hard boards and the like, which usually are 4 feet wide by 8, 10 or 12 feet in length. These large boards are unwieldy for sawing on the usual power saws of the type of those generally in use around building operations. These boards can, of course, be cut on the usual small shop power saw, but this requires at least two men to hold and feed the sheet, or such can be cut with a hand-power saw if there is a sufficiently large table top available, but in either case the sawing can be only along a marked line and guided by the eye.

As contrasted to the foregoing, the device hereof provides most ample support for sawing of wide board, takes up but relatively little floor space, and provides for accurate guided sawing both across and lengthwise.

The apparatus comprises a board support or bed which is an easel-like structure which preferably leans against a wall or other suitable support instead of being provided with a third supporting leg. The board support comprises a supporting surface sufficiently large to support the wide board, positioned substantially vertically and with its lower edge resting on an elongated guide member.

Mounted over the wide board support and suitably secured thereto there is provided a cross slide in which is received a turn-table saw mounting to which a hand power saw may be secured. The cross slide extends across the width of the support; and, with the turntable in one position, traverse thereof along the cross slide will cut a wide board across its width. When the turntable is turned at right angles and secured, the big board may be sawed lengthwise by pushing the board, supported on its guide member, through the saw. The specific construction of the apparatus and its use will be hereinafter more fully described.

The principal object of this invention is the provision of a simple but practical device for accurate and easy sawing of big boards of the type above referred to. Other objects are to provide such apparatus constructed to occupy a relatively small floor space, one readily operated by but one man and which is of simple construction and relatively inexpensive.

The inventions hereof are clearly illustrated in the accompanying drawings, in which—

Figure 1 is an end elevation;
Figure 2 is a face elevation;
Figure 3 is a top plan view of the turntable element;
Figure 4 is a section taken on line 4—4 of Figure 3;
Figure 5 is a section of a detail taken on line 5—5 of Figure 3;
Figure 5A is an end elevation of the latch keeper; and
Figure 6 is a section of a detail taken on line 6—6 of Figure 3.

The apparatus comprises a support or bed comprised principally of leg members 10, angled to provide a modified A frame to which are secured suitable board members such as 11 attached by securing means 12, which may be nails but are preferably screws, bolts or rivets. At their upper ends the leg members are secured to a member 13 and adjacent their bottom ends to a member 14 positioned just below the bottom board member 11, each also being secured by suitable fastenings 12. If the bed is comprised of strips 11, as shown, a reinforcing strip 15 may be included, as shown in Figure 2, to strengthen and stiffen the structure.

As of assistance in constructing the device, the various elements 10, 11, 13 and 14 are preferably, respectively, 2 x 4's, 1 x 4's, 2" x 4" and 2" x 6". Members 11 are preferably 8 feet long and 14 is 12 feet long. The bed or support portion is shown as comprised of eight spaced members 11, but it will be understood, of course, that the size and number of these may be varied, or there may be substituted a sheet of plywood or other suitable material. The bed or support should be about 5' x 8' and provide a reasonable support for a fiber board or the like when placed thereon.

For use, the frame comprising the bed or support preferably is supported against a wall, studs or posts 17, as clearly shown in Figure 1, with the bottom spaced out slightly from the support at the bottom. The angle of inclination is unimportant, but in general an inclination of 15° will be quite satisfactory.

A cross slide is mounted on the frame and is secured to members 13 and 14. This cross frame which comprises a guide and slideway for the turntable member, which will subsequently be described, is conveniently comprised of cross members 18 to which are suitably secured spacer members 19, to which in turn track members 20 are secured. The track members 20 are wider than the spacer members 19 and extend beyond the inner edges of and overhang the spacers 19. The turntable member is mounted to the overhanging portions to track members, as is clearly shown in Figure 4, and which will be subsequently more fully described.

The cross slide is mounted to top and bottom members 13 and 14 of the frame, approximately mid-way of the length thereof, by suitable screws 22 which extend through holes provided in members 13 and 14 and screw into a threaded opening provided substantially centrally in each of cross members 18. Top and bottom members being preferably 2" thick, whereas members 11 are 1" thick, direct mounting of the cross slide to the surfaces of the members will thus provide sufficient clearance for the usual big boards which seldom exceed the 25/32" thickness of insulating sheathing. If greater clearance is desired it may be obtained by inserting shims 23 (Fig. 4) to requisite thickness between members 13 and 18. For less clearance shims 23 as required are transferred to between member 15 and the head of screw 22.

A turntable member is provided for mounting on the cross slide and a power saw, preferably an electric hand power saw is mounted on the turntable. The turntable member comprises a frame formed of angle members 26 which may, of course, be formed of separate lengths or of one piece, in either case suitably welded, riveted or the like to provide a square frame as shown in Figure 3. To two opposite outer edges of the frame there are secured sections of channel 27 which are welded or riveted in place. The dimension of the frame is such that channels 27 will mount on and slide on the overhang projection of track members 20 previously described. The frame may be strengthened by substantially triangular corner blocks 28 mounted in the corners of the frame and secured to the angles 26 by means of machine screws 29. Retaining strips 30, the purpose of which will subsequently be described, may also be secured in place by screws 29.

For mounting the saw to the turntable frame comprised of angle members 26 and in order that the apparatus may expeditiously saw big boards either across or lengthwise, a turntable 32 is provided and mounted to the frame.

The turntable 32 may conveniently be a circular sheet of ¼" tempered hardboard or other suitable sheet material having a diameter to fit into the channel members 26 of the turntable frame. The turntable has a slot 33 through which a circular saw may project and in its edge there are provided notches or recesses 34 spaced 90° circumferentially for purposes later to be described. Also there will be provided holes 35 for bolts for securing an electric hand saw.

The turntable 32, a retaining strip 30 having been temporarily removed, is placed in the turntable frame resting on the horizontal legs (Fig. 4) of the frame angles 26 and is secured in place by replacing and securing the retaining strip. This turntable will revolve in the frame, and a circular saw extending through slot 33 may be positioned at right angles to its former position by turning the turntable through 90°.

To position the saw for a right angle cut across a board and to lock it in position there is provided a latch, as shown, which cooperates with a recess 34 in the edge of turntable 32 to secure the turntable against turning. The latch is conveniently mounted on a corner block 28 by screws 36 and comprises a keeper member 37 provided with a central tunnel portion 38 in which bolt member 39 is mounted and slides. The outer end of bolt member 39 engages a recess 34 to secure turntable 32 against rotation. For sawing a sheet lengthwise bolt 39 is drawn back to release turntable 32 which may then be turned 90° whereupon the bolt 39 is again advanced to engage the other recess 34 and lock the turntable 32 displaced 90° from its former position.

An electric hand saw is attached to turntable 32 by bolts passing through bolt holes 35 and registering openings previously provided in its base plate. It is, of course, to be understood that the saw is to extend through the slot 33 and that the device is suitably prepared for attachment. If the device has a lower saw guard, it is preferably removed. If necessary, a special base plate may be attached for mounting, and depending on its construction, other minor modifications may be necessary.

There is secured to top angle member 26, as illustrated, a hook-like member 40 to which may be attached cord or the like 41 which is attached to a spring balance 42 such as is available on the market.

In strips 11, which make up the bed of the device, narrow slots 45 (Figs. 2 and 4) are provided of a width slightly wider than the saw used and about ⅛" to 3/16" deep, so that the saw when traversed on the cross slide may be set in sufficiently to cleanly cut through the sheet being sawed. Also in strips 11 there are provided wider grooves 46 which are arcuately formed and are preferably 3/16" deep, or slightly more. These grooves 46 provide clearance so that when the turntable is turned for lengthwise cuts, the turntable member may freely move up and down on the cross slide without interference between the saw and strips 11.

For securing the turntable member when lengthwise cuts are to be made, there is provided a lock member which may be a set screw or the like 47 (Figs. 3 and 6) which is entered into a threaded opening in one of the channel members 27.

Also an indicator or pointer may be mounted on the turntable frame member and, as shown, this comprises a narrow strip 48 mounted on and secured to a corner block 28 by screws 49. The outer end of strip 48 extends beyond the edge of the turntable frame and overhangs a track member 20 on which there may be provided a scale which can be suitably marked so that when the saw is turned for sawing a board lengthwise, the pointer will indicate the distance at which the saw is set above the upper edge of support member 14.

A hand electric power saw which is secured to turntable 32 is indicated and identified by numeral 50.

The manner of use of the device is very simple and should be obvious; however, such will be briefly described. The frame or bed is set as shown in figure to lean at a slight angle against a wall or suitable support, and an electric hand power saw 50 is secured to turntable member 32. Due to the spring tension exerted by spring balance 42, the cord or tape 41 will draw the turntable member to the top of the cross slide. A big board may now be slid into the frame resting on the top edge of member 14 and entered between the bed members 11 and the cross slide. The board should, of course, be so positioned that the line along which it is to be cut off is in line with the saw, which may be designated by a locating mark 52 (Fig. 2) on the face of member 14, or positioning may be determined in accordance with a scale 53 also on the face of member 14 and extending from locating mark 52.

After the board is positioned as above, the saw is started and then pushed downwardly across the board against the tension of the spring balance which, when the cut is completed, will return the saw to the top of its traverse.

For sawing a big board lengthwise the latch holding the turntable is retracted, the turntable is turned 90° and latched in position. The turntable frame is then pulled downwardly until the saw is positioned to make the desired cut and it is secured in position by tightening the securing set screw down against the rail member. The big board is then set on the top edge of the bottom rail member and pushed through the saw which will sever the board lengthwise.

It will be understood that the cuts just described are not necessarily made across the full width or length of the board. Either or both cuts may be made to the extent desired as, for example, a quarter may be cut from the board by stopping each of the lengthwise and cross cuts when they reach the center of the board.

Certain modifications or alternatives of the device have been described, and it will be readily apparent that others within the spirit and scope of the description will occur to those skilled in the art. However, the essentials of the construction of the device in its presently preferred form have been above disclosed.

I claim:

1. A wide board saw as described comprising in combination, a board supporting bed, the bed having adjacent a longitudinal edge a shoulder rest extending above the plane of the bed and comprising a support for an edge of a board on the bed, a cross slide means supported above the bed, spaced therefrom and extending across the width thereof, a power saw carrying member slidably mounted to the cross slide means, a rotatable member mounted to the saw carrying member and rotatable relative thereto, and an electric hand saw unit mounted to the rotatable saw carrying member whereby the electric hand saw unit is selectively mounted relative the saw carrying member in either of two positions, one displaced at a right angle with respect to the other.

2. A wide board saw as described comprising in combination, a supporting frame comprising in part supporting legs, a board supporting bed secured to the frame, the bed at a longitudinal edge thereof having a raised supporting shoulder projecting above the surface plane of the bed proper, a cross slide comprising spaced slide members mounted at their ends to opposite edges of the bed and spaced from the bed, a frame, mounting members on opposite edges of the frame slidably mounting the frame to the spaced slide members, the frame comprising a perimetric wall at, at least three equally spaced points tangent to a circle, the wall at the points of tangency having lower inwardly directed flanges and retaining members spaced from, positioned above and removably secured to the frame whereby the wall, a flange and a retaining member constitute a channel structure, an electric hand saw unit carrying member mounted in said channel structure of the frame, a power hand saw unit mounted to said electric hand saw unit carrying member and a latch member selectively securing the electric hand saw unit carrying member to the frame in either of two positions displaced, one with respect to the other, by an angle of 90°.

3. In the combination of claim 2, a tensioning device secured adjacent the edge of the bed, opposite that edge provided with a supporting shoulder, and to the frame and biasing the frame toward the edge of the bed adjacent which the tensioning device is secured.

4. A wide board power saw apparatus comprising an electric hand saw unit having a circular blade, a turntable member to which the electric hand saw unit is secured, the turntable member having a slot through the member and through which the saw blade extends, a frame member in which the turntable member is rotatably mounted, the frame member provided on opposite edges with mounting means, spaced cross slide members to which said mounting means slidably mounts the turntable carrying frame, a board supporting bed comprising at a longitudinal edge thereof a raised supporting shoulder extending above the plane of the bed proper and securing means mounting the spaced cross slide members transversely over and in operative relation to the bed, extending thereacross and spaced therefrom.

5. A wide board saw as described comprising in combination, a supporting frame comprising in part supporting legs, a board supporting bed secured to the frame, the bed at a longitudinal edge thereof having a raised supporting shoulder projecting above the surface plane of the bed proper, a cross slide comprising spaced longitudinal members and transverse members connecting the longitudinal members adjacent their ends, the cross slide mounted over the bed, extending transversely thereof and spaced therefrom, at each end of the cross frame, a stack of shim elements interposed between the transverse members of the cross slide and the supporting frame and means securing together the cross slide, shims and supporting frame as a unitary structure.

6. An electric hand saw unit mounting assembly for carrying an electric hand saw tool and comprising an elongated guide member, a cross slide means mounted thereto, an electric hand saw tool carrying table mounted thereto and rotatable in the plane of the said saw table, and means for securing an electric hand saw unit to the said rotatable table, the rotatable table having an elongated slot therein through which a saw blade on said tool may extend.

7. An electric hand saw mounting assembly for carrying an electric hand saw tool and comprising an elongated guide member, a cross slide means mounted thereto, an electric hand saw tool carrying means mounted thereto and relatively rotatable in the plane of the saw tool carrying means, and means for mounting an electric hand saw unit to the said saw tool carrying means, the relatively rotatable means provided with a opening extending therethrough and through which opening the saw blade of said tool may extend.

8. A wide board saw as described comprising in combination, a board supporting bed, the bed having adjacent a longitudinal edge a shoulder rest extending above the plane of the bed and comprising a support for an edge of a board on the bed, a cross slide, means supporting the cross slide above the bed spaced therefrom and extending across the width thereof, the said supporting means adjustable and varying the spacing of the slide and the bed, a power saw carrying member slidably mounted to the cross slide means, a relatively rotatable member mounted to the saw carrying member and an electric hand saw unit mounted to the relatively rotatable saw carrying member whereby the electric hand saw unit is selectively mounted relative the saw carrying member in either of two positions, one displaced at a right angle with respect to the other.

References Cited in the file of this patent

UNITED STATES PATENTS

| | | |
|---|---|---|
| 988,038 | Shipley | Mar. 28, 1911 |
| 1,266,916 | Bumpus | May 21, 1918 |
| 1,584,086 | Fonda | May 11, 1926 |
| 1,600,619 | Briere et al. | Sept. 21, 1926 |
| 1,756,121 | Hedgpeth | Apr. 29, 1930 |
| 1,842,630 | Rodning | Jan. 26, 1932 |
| 2,347,359 | Miller | Apr. 25, 1944 |
| 2,580,110 | Mabry | Dec. 25, 1951 |
| 2,581,766 | McConnell | Jan. 8, 1952 |
| 2,629,410 | Cadwell | Feb. 24, 1953 |
| 2,630,146 | Van Tuyl | Mar. 3, 1953 |

FOREIGN PATENTS

| | | |
|---|---|---|
| 473,491 | Great Britain | Oct. 14, 1937 |